United States Patent
Amaratunga et al.

(10) Patent No.: US 10,319,137 B2
(45) Date of Patent: Jun. 11, 2019

(54) SYSTEM AND METHOD FOR INJECTION OF MAPPING FUNCTIONS

(71) Applicant: Scalable Display Technologies, Inc., Cambridge, MA (US)

(72) Inventors: Kevin Amaratunga, Belmont, MA (US); Samson J. Timoner, Cambridge, MA (US); Rajeev J. Surati, Cambridge, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 0 days.

(21) Appl. No.: 14/863,216

(22) Filed: Sep. 23, 2015

(65) Prior Publication Data

US 2016/0086370 A1 Mar. 24, 2016

Related U.S. Application Data

(63) Continuation of application No. 12/818,102, filed on Jun. 17, 2010, now abandoned.

(Continued)

(51) Int. Cl.
*G06T 15/00* (2011.01)
*H04N 5/74* (2006.01)
(Continued)

(52) U.S. Cl.
CPC ........ *G06T 15/005* (2013.01); *G09G 3/003* (2013.01); *G09G 5/00* (2013.01); *H04N 5/74* (2013.01);
(Continued)

(58) Field of Classification Search
CPC ......... G06T 15/005; H04N 5/74; H04N 9/12; H04N 9/31; H04N 9/3138; G09G 3/003; G09G 5/00; G09G 2320/02
(Continued)

(56) References Cited

U.S. PATENT DOCUMENTS 5,381,349 A  1/1995  Winter et al.
5,574,473 A  11/1996  Sekiguchi
(Continued)

FOREIGN PATENT DOCUMENTS

EP    0982934      3/2000
JP    2000067720 A  3/2000
(Continued)

OTHER PUBLICATIONS

Humphreys et al. Chromium: a stream-processing framework for interactive rendering on clusters, Jul. 2002, ACM Transactions on Graphics (TOG)—Proceedings of ACM SIGGRAPH 2002, vol. 21 Issue 3, 1-10.*

(Continued)

*Primary Examiner* — Robert J Craddock
(74) *Attorney, Agent, or Firm* — Loginov & Associates, PLLC; William A. Loginov

(57) ABSTRACT

A method and system for improving display quality by injecting a portion of computer code into an existing compositor, using the portion of computer code to apply a mapping function to a first digital image, and forming a second digital image based upon the first digital image as adapted by applying the applied mapping function in the compositor. The second digital image may then be displayed to a viewer via one or more displays where each display forms a part of the displayed digital image. The result may be used for creation of blended or stereoscopic images. The mapping function may be also adapted for modification of geometry or correction of a characteristic (such as color, intensity, etc.) of the display system where such characteristic may be sensed using a detector. The portion of code may be injected into a graphics driver controlling hardware composition for a displayed digital image.

15 Claims, 4 Drawing Sheets

Related U.S. Application Data

(60) Provisional application No. 61/218,397, filed on Jun. 18, 2009.

(51) Int. Cl.
  *H04N 9/12* (2006.01)
  *H04N 9/31* (2006.01)
  *G09G 3/00* (2006.01)
  *G09G 5/00* (2006.01)

(52) U.S. Cl.
  CPC ............. *H04N 9/12* (2013.01); *H04N 9/31* (2013.01); *H04N 9/3138* (2013.01); *G09G 2320/02* (2013.01)

(58) Field of Classification Search
  USPC ........................................... 345/419
  See application file for complete search history.

(56) References Cited

U.S. PATENT DOCUMENTS

| | | | |
|---|---|---|---|
| 5,617,259 | A | 4/1997 | Inoue |
| 6,018,629 | A | 1/2000 | Tojima |
| 6,456,339 | B1 | 9/2002 | Surati et al. |
| 6,520,647 | B2 | 2/2003 | Raskar |
| 6,527,395 | B1 | 3/2003 | Raskar et al. |
| 6,677,956 | B2 | 1/2004 | Raskar et al. |
| 6,695,451 | B1 | 2/2004 | Yamasaki et al. |
| 6,709,116 | B1 | 3/2004 | Raskar et al. |
| 6,715,888 | B1 | 4/2004 | Raskar et al. |
| 6,729,733 | B1 | 5/2004 | Raskar et al. |
| 6,733,138 | B2 | 5/2004 | Raskar |
| 6,755,537 | B1 | 6/2004 | Raskar et al. |
| 6,764,185 | B1 | 7/2004 | Beardsley et al. |
| 6,779,187 | B1 | 8/2004 | Hammond |
| 6,781,591 | B2 | 8/2004 | Raskar |
| 6,793,350 | B1 | 9/2004 | Raskar et al. |
| 6,811,264 | B2 | 11/2004 | Raskar et al. |
| 6,834,965 | B2 | 12/2004 | Raskar et al. |
| 6,919,900 | B2 | 7/2005 | Wilt |
| 7,001,023 | B2 | 2/2006 | Lee et al. |
| 7,131,733 | B2 | 11/2006 | Shibano |
| 7,137,707 | B2 | 11/2006 | Beardsley et al. |
| 7,154,395 | B2 | 12/2006 | Raskar et al. |
| 7,242,818 | B2 | 7/2007 | Beardsley et al. |
| 7,252,387 | B2 | 8/2007 | Raskar et al. |
| 7,292,269 | B2 | 11/2007 | Raskar et al. |
| 7,355,583 | B2 | 4/2008 | Beardsley et al. |
| 7,421,111 | B2 | 9/2008 | Dietz et al. |
| 2002/0109655 | A1 | 8/2002 | Yer et al. |
| 2005/0062678 | A1 | 3/2005 | Mark et al. |
| 2005/0117126 | A1 | 6/2005 | Miyazawa et al. |
| 2005/0280605 | A1 | 12/2005 | Tsao |
| 2007/0097113 | A1 | 5/2007 | Lee et al. |
| 2007/0171380 | A1 | 7/2007 | Wright et al. |
| 2008/0143964 | A1 | 6/2008 | Cowan et al. |
| 2008/0246781 | A1 | 10/2008 | Surati et al. |

FOREIGN PATENT DOCUMENTS

| | | |
|---|---|---|
| JP | 2005077892 B1 | 3/2000 |
| JP | 2001230991 A | 8/2001 |
| JP | 2004072553 A | 3/2004 |
| JP | 2006058608 A | 3/2006 |
| JP | 2007093702 A | 4/2007 |
| JP | 2007318754 A | 12/2007 |
| JP | 2008113416 A | 5/2008 |
| JP | 2010521705 A | 6/2010 |
| JP | 2011511316 A | 4/2011 |
| KR | 100384974 | 5/2003 |
| KR | 1020060126435 | 11/2011 |
| WO | 199833106 | 7/1998 |
| WO | WO0007376 | 2/2000 |
| WO | WO 2007111589 A1 | 10/2007 |
| WO | WO 2008115464 A1 | 9/2008 |

OTHER PUBLICATIONS

Richter, et al., "Windows Via C/C++ (5th Edition) (Developer Reference)", Dec. 8, 2007, Publisher: Microsoft Press, Published in: US.

* cited by examiner

SYSTEM AND METHOD FOR INJECTION OF MAPPING FUNCTIONS

RELATED APPLICATIONS

This application is a continuation of co-pending U.S. patent application Ser. No. 12/818,102, filed Jun. 17, 2010, entitled SYSTEM AND METHOD FOR INJECTION OF MAPPING FUNCTIONS, which application claims the benefit of U.S. Provisional Application Ser. No. 61/218,397, filed Jun. 18, 2009, entitled SYSTEM AND METHOD FOR INJECTION OF MAPPING FUNCTIONS, the entire disclosures of each are herein incorporated by reference.

FIELD OF THE INVENTION

This invention relates to digital video display systems, and more particularly to operating systems for large-scale displays composed of a plurality of individual display devices.

BACKGROUND OF THE INVENTION

Digital imaging systems display visual information utilizing a control source and a display. The control source, such as a computer system, may utilize mapping functions to enable applications such as combining multiple projected images into one image to make a super resolution display. Displays include any devices that are capable of visually showing information, still pictures, or video (moving pictures). A display generally consists of one of more light sources, and a method of spatially modulating the light can be divided into (1) direct view displays, and (2) projection displays. Direct view displays include flat panels such as liquid crystal displays (LCDs) and plasma display panels (PDPs). Projection displays include technologies that use microdisplay panels such as (1) digital light processing (DLP) which are based on digital micromirror devices (DMDs), (2) transmissive LCD panels, and (3) liquid crystal on silicon (LCOS). The quality of a digital imaging system is determined by the expectations of the viewer. Quality factors include resolution, contrast, geometric accuracy, color accuracy, freedom from distracting artifacts and other performance properties which contribute to the generally pleasing nature of the image or allow the displayed digital image to accurately represent the original digital image or an image found in nature. It is desired to correct for certain inaccuracies in the image produced by a display by applying corrective measures to image information.

Three-dimensional imaging may refer to an image in the plane of the display that is rendered to appear with perspective. Three-dimensional imaging is also used to refer to stereoscopic digital imaging where the image comes out of the plane of the display to fill three-dimensional space. Stereoscopic digital imaging presents a different image to the left eye and the right eye in order to simulate the effect of viewing natural images in three-dimensional space. Stereoscopic imaging may contribute to the perceived quality of digital imaging systems if the three-dimensional images are properly presented to each eye without causing eyestrain. It is generally desired to provide a mechanism to support such image creation within a display system and improve overall display quality.

SUMMARY OF THE INVENTION

The present invention is a method and system for improving display quality by injecting a portion of computer code into an existing compositor operatively arranged and configured on a computing system, using the portion of computer code to apply a mapping function to a first digital image, and forming a second digital image based upon the first digital image as adapted by applying the applied mapping function. The second digital image is then displayed to a viewer via one or more displays wherein each display forms a part of the displayed digital image. The contribution of each display can be such that there is varying overlap, from partial overlap to substantially complete overlap. Substantially complete overlap enables the display of stereoscopic images. The mapping function can be used for modification of geometry, creation of blended images or correction of a characteristic (such as color, intensity, etc.) of the display system. The characteristic can be sensed using a detector such as a camera directed at the displayed image, or by internal sensing of the image. The portion of code can be injected into a graphics driver controlling hardware generating a portion of a displayed digital image. The overall display system may be based upon one or more computer systems each with one or more graphics cards connected to one or more display devices such projector.

BRIEF DESCRIPTION OF THE DRAWINGS

The invention description below refers to the accompanying drawings, of which.

DETAILED DESCRIPTION

Figure 1:
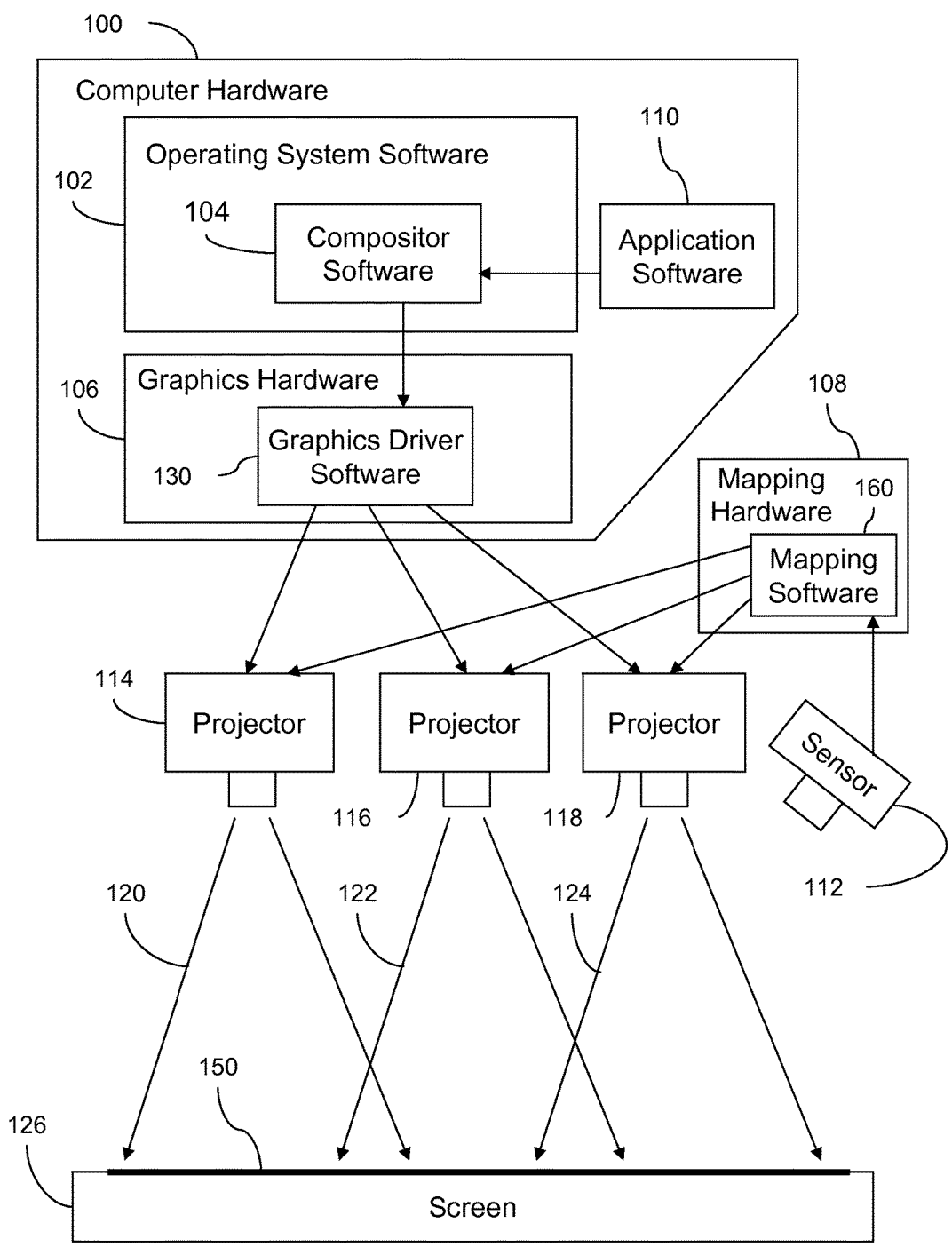
FIG. 1 is a schematic view of a digital imaging system with external mapping according to an exemplary implementation.

A detailed description of super resolution displays, in which the teachings of illustrative embodiments here can be based, may be found in U.S. Pat. No. 6,456,339, the teachings of which are entirely incorporated herein by reference as useful background information. Digital imaging systems may achieve high-resolution displays by combining more than one display such that the displays add their pixels together into one displayed digital image composed of multiple parts. Each part of the displayed digital image is composed primarily of pixels from an individual projector, but also has overlap regions from the adjacent displays. The parts of the displayed digital image are partially overlapping in order to perform gradual blending between the parts. The partial overlap regions can extend over approximately 10% to 30% of the area of the displayed digital image. A mapping function can be applied to the original digital image to split it into parts and to reassemble the parts for display. The mapping function is defined as a mathematical transformation which modifies a digital image to produce a second digital image which is changed in some way. A correction function is a specific type of mapping function which applies a desired correction to a digital image. The mapping function can include such transformations as warping, color matching, lateral color correction, or any other desired changes to the digital image. In some cases, the mapping function may degrade the image quality as measured in the traditional sense in order to achieve a specific desired effect.

An alternate embodiment of the system configuration makes use of substantially complete overlap of digital images from multiple displays (the displays often being arranged as a "multiplicity" of two or more, and at least a "plurality" of two or more in various embodiments). Substantially complete overlap is overlap of at least 90%. In one embodiment, the substantially complete overlap is aligned so that the parts from multiple displays are exactly aligned with accuracy down to the pixel or sub-pixel level. This configuration can be used to increase the amount of light by stacking multiple displays. In another embodiment, the system provides substantially complete overlap, but the parts consist of left eye and right eye images to enable stereoscopic display of three-dimensional images. Exact pixel alignment may not necessary in the case of stereoscopic projection.

A special case of stacking occurs when there is only a single projector. In this case, a lens can be used to wrap the image in such as way that one side wraps to meet the other side of the image.

Another alternate embodiment of the system configuration makes use of digital images that do not overlap. In this case, the parts may be joined at the edges or may have a gap region between the edges. In the case of gap between the edges, the image can be shifted so that important features of the displayed digital image do not fall in the gap region.

Another alternate embodiment of the system configuration employs a third and fourth display that partially overlaps when the first and second display have substantially complete overlap as a stereoscopic image.

Reference is now made to FIG. 1, which shows a digital imaging system with external mapping generally by way of background. In this implementation the mapping function is created by hardware and software that is external to the computer. A digital image is created by application software 110 and sent to compositor software 104. The digital image can be created from various sources, such as being stored on the computer hardware memory, or can be generated based on a predetermined algorithm. Compositor software 104 is part of operating system software 102 which runs on computer hardware 100. Compositor software 104 sends the digital image to graphics driver software 130 which runs on graphics hardware 106. Graphics driver software 130 divides the digital image into multiple parts and sends the parts to projectors 114, 116, and 118 in a manner generally described in the art.

Illustratively, the compositor 104 is the part of the computer operating system 102 that arranges various parts of the digital image that will be shown by the computer. In conventional computer operation, the compositor combines the windows displayed from various applications and the operating system. It also handles translucency of windows in certain operating systems, such as Microsoft's Windows Vista® operating system, which include a translucency capability.

The digital image can comprise a still image or a series of still images that make a moving image (also called video). The digital image may be generated in the computer or it may be generated externally from the computer. The digital image may be captured by the computer with an image capture card in the computer.

Projectors 114, 116, and 118 project modulated light beams 120, 122, and 124 respectively. Light beams 120, 122, and 124 form projected digital image 150 on screen 126. Sensor 112 senses the parameters of projected digital image 150 and sends the parameters to mapping software 160 which runs on mapping hardware 108. Mapping software 160 uses a mapping function to calculate mapping signals and sends the mapping signals to projectors 114, 116, and 118. In various embodiments, the mapping function is adapted to fit the graphics driver software and display. Projectors 114, 116, and 118 use the mapping signals to apply the mapping function to the digital image from graphics driver 130. Mapping hardware 108 can be computer hardware, such as a computer card that runs on a conventional computer, or mapping hardware 108 can be specialized hardware that is custom designed to perform mapping calculations. In an embodiment where mapping hardware 108 is computer hardware, it can comprise a card that is installed into computer 100, or it can be installed into a separate computer dedicated to performing the mapping calculations. In another embodiment where mapping hardware 108 is a computer hardware, it can comprise a processing unit and a digital communication link configured to receive an image data stream from a sensor. The compositor software is shown as being part of the operating system in FIG. 1, but in some systems, the compositor can reside outside of the operating system. The mapping hardware and software is shown as residing outside of the computer hardware in FIG. 1, but in some systems, the mapping hardware and software can be part of the computer hardware.

Figure 2:
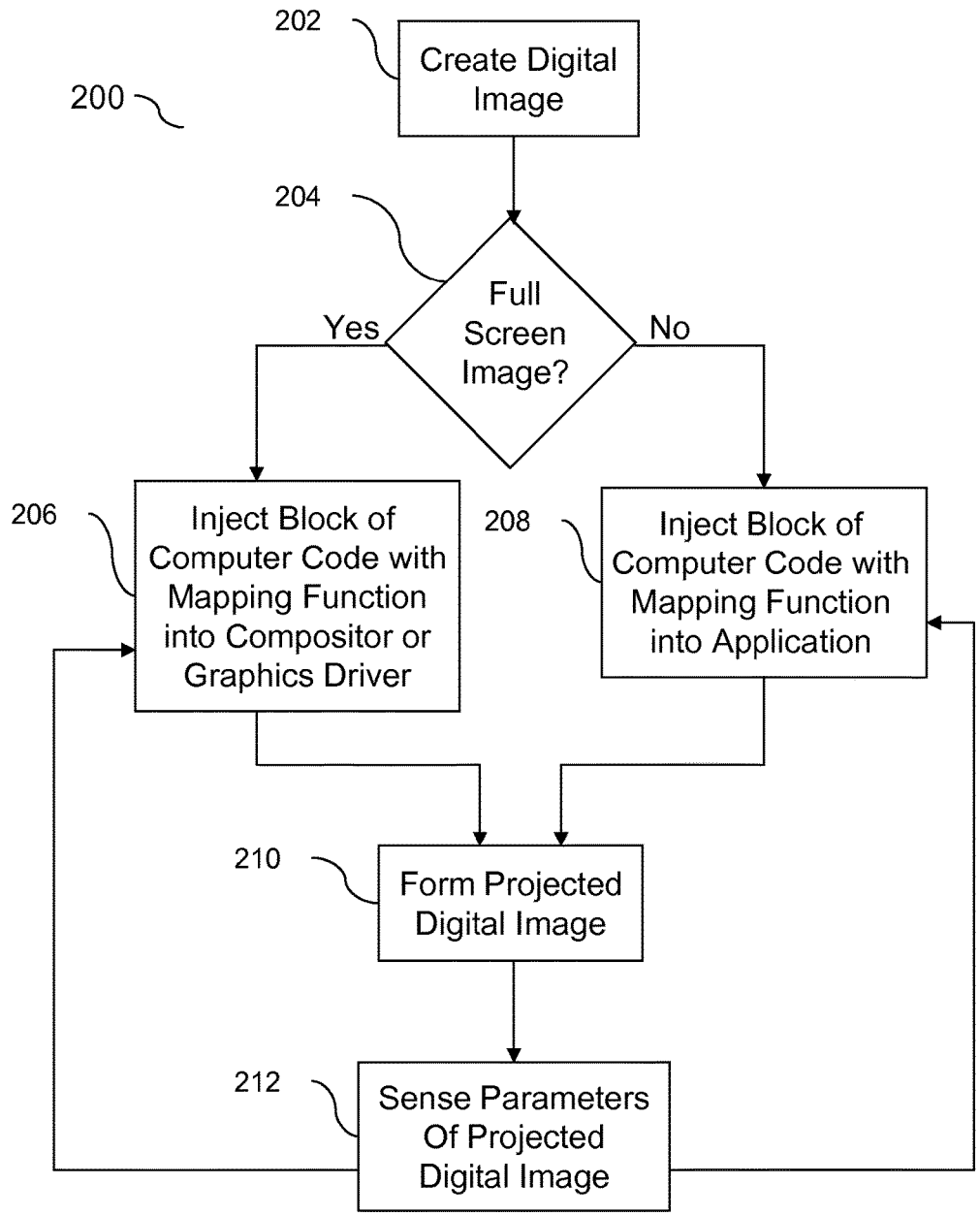
FIG. 2 is a flowchart of mapping function injection according to an illustrative embodiment.

FIG. 2 shows a procedure 200 for performing mapping function injection. The mapping function is injected into the computer that is displaying the digital image. In step 202, a digital image is created. This can occur by any appropriate mechanism, such as retrieving pixel information from a media data file in a predetermined format such as MPEG, AVI, etc. The procedure of decompression, scaling, or formatting is further contemplated as part of retrieving the pixel information. In decision step 204, a decision is made depending on the whether the digital image will be projected as a full-screen image. The full-screen image can be determined by any appropriate mechanisms depending on the configuration of the digital imaging system, such as through a user interface, through a user API, from a stored memory located internal to, or external of, the computer hardware, and should be apparent to those skilled in the art to be incorporated therein. If it will be a full-screen image, a portion of computer code with the mapping function is injected into the compositor or graphics driver in step 206. The compositor consists of compositing software and the graphics driver consists of graphics driver software. If the digital image will not be projected as a full-screen image, the digital image with mapping function is injected into the appropriate application in step 208. In step 210, the projected digital image is formed from the digital image with mapping function. In optional step 212, the parameters of the projected digital image are sensed and a signal based on those parameters is sent back to the portion of computer code with the mapping function in step 206 or 208. Step 212 allows the overall digital imaging system to use feedback to perform self-correction if desired.

Figure 3:
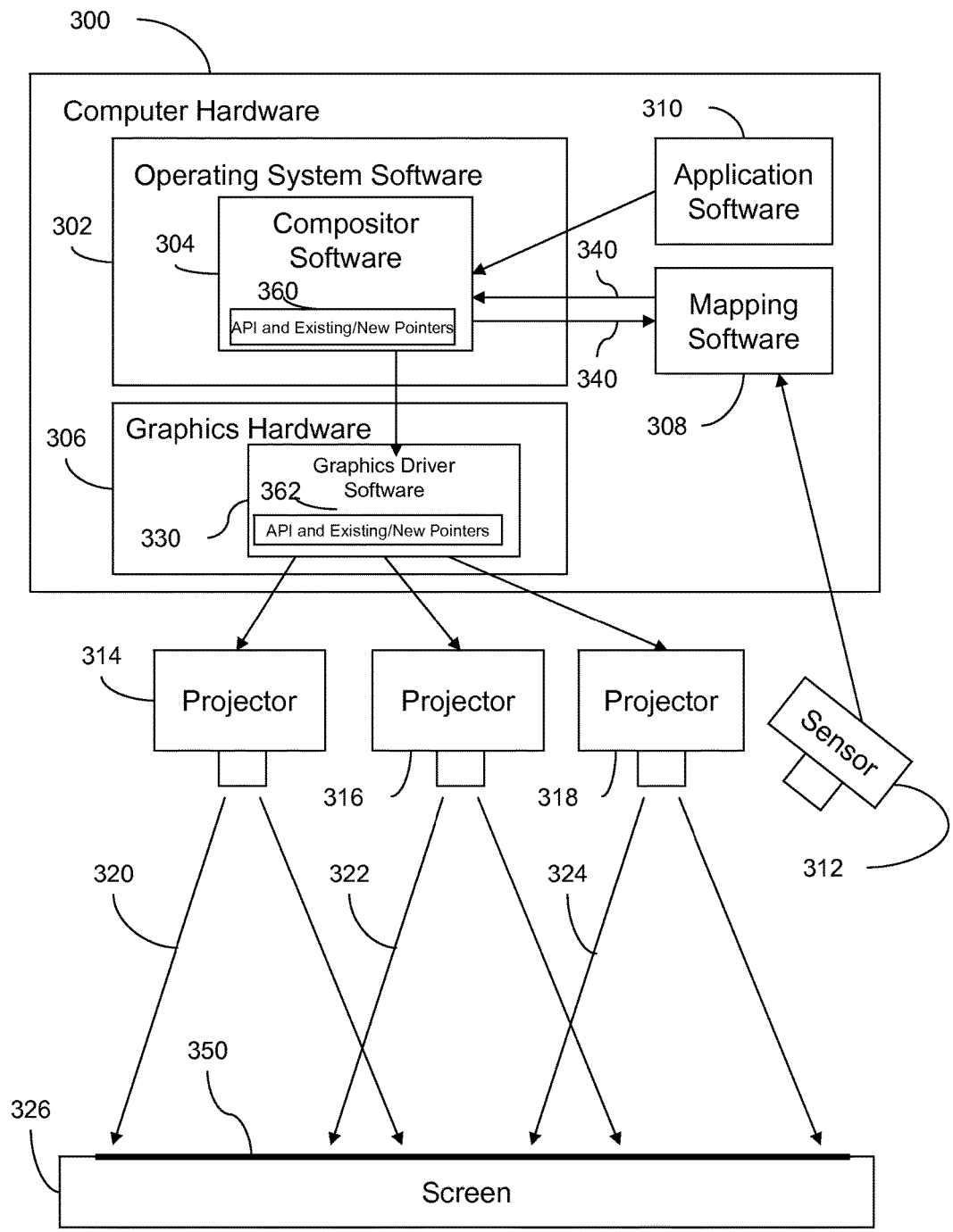
FIG. 3 is a schematic view of a digital imaging system with injection into a compositor according to an illustrative embodiment.

FIG. 3 shows a digital imaging system with injection into a compositor. The digital imaging system shown in FIG. 3 uses the procedure 200 of mapping function injection that is shown in FIG. 2. A digital image is created by application software 310 and sent to compositor software 304. Mapping software 308 acts internally (within the computer) to inject a portion of computer code into compositor software 304. The injection step is shown by arrows 340. Mapping software 308 intercepts the flow of execution of compositor software 304 using conventional techniques described below, redirects the execution to apply the mapping function, and then returns operation to compositor software 304. Compositor software 304 is part of operating system software 302 which runs on computer hardware 300. Compositor software 304 sends the digital image with mapping function to graphics driver software 330 which runs on graphics hardware 306. Graphics driver software 330 divides the digital image into multiple parts and sends the parts to projectors 314, 316, and 318. Projectors 314, 316, and 318 project modulated light beams 320, 322, and 324 respectively. Light beams 320, 322, and 324 from projected digital image 350 on screen 326. Sensor 312 senses the parameters of projected digital image 350 and sends the parameters to mapping software 308 as represented by the return arrow from the sensor 312. The parameters are organized in a manner that the mapping software can employ them to modify its data, and thereby provide the compositor with the updated mapping function.

More particularly, in an illustrative embodiment, the interface to software such as a driver or operating system is accomplished via an application programming interface (API) 360, 362, or equivalent mechanism know to those ordinarily skilled in software development. APIs 360, 362 can respectively reside within the compositor software 304, the graphics driver software 330 and/or within another application as appropriate. The API provides a communications mechanism between software modules (where such modules can be developed by different sources or entities at different time) in order to support the building of applications. Illustratively, calls through the API by another program or process cause the execution of code that depends upon the information in the call. It is contemplated to modify a stream of execution by intercepting calls to the API, inserting replacement and/or different code to execute, and then either (a) continuing the call as normal or (b) returning to the caller. This is typically accomplished by modifying the existing API interface by copying one or more of the existing API pointers to the existing application code and replacing them with new pointers (depicted in API blocks 360, 362) pointing to new code for execution. That new code can then either (a) return to the code that called the API, or (b) continue the call through the old code via the copied API pointers which then return as needed. In an illustrative embodiment, the graphics driver 330 provides an API 362 that allows programs (for example the operating system 302) to make calls that cause code at the in the graphics driver 330 to be executed (for instance, to paint a pattern at a particular location). The present invention can intercept the API calls to the graphics driver 330 by copying the original API pointer and inserting a new pointer to point to the mapping code (308). Thus, during execution, if a particular API call is made, the mapping code can modify the data in the API call and then pass the stream of code execution to the pre-existing API code via the copied API pointer.

By way of operational example, if data is initially formatted for display on a certain type/model of display, such as a flat screen, then the mapping code can be adapted to intercept the data at the graphics driver level so as to modify for display on a different type/model of display, such as a screen with a different geometry. The mapping code can then be passed along for display via the original graphics driver. While not shown, the depicted API and pointer arrangement, or an appropriate variation thereof, is applicable to the embodiments of FIG. 1 and FIG. 4.

Figure 4:
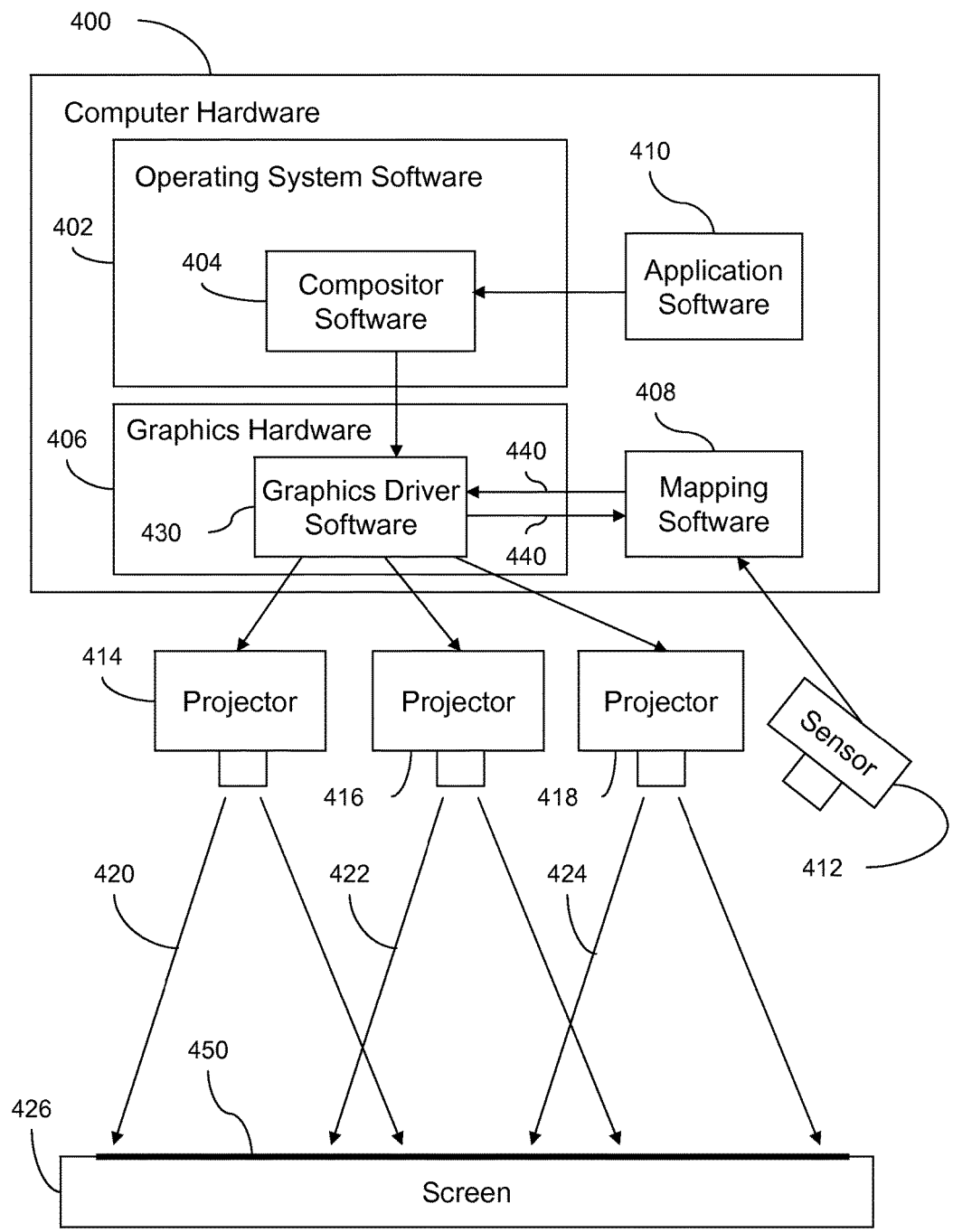
FIG. 4 is a schematic view of a digital imaging system with injection into a graphics driver according to an illustrative embodiment.

FIG. 4 shows a digital imaging system with injection into a graphics driver that can be conventional or custom-designed. The digital imaging system shown in FIG. 4 uses the procedure 200 for mapping function injection that is shown in FIG. 2. A digital image is created by application software 410 and sent to compositor software 404. Compositor software 404 is part of operating system software 402 which runs on computer hardware 400. Compositor software 404 sends the digital image to graphics driver software 430 which runs on graphics hardware 406. Mapping software 408 injects a portion of computer code into graphics driver software 430. The injection step is shown by arrows 440. Mapping software 408 intercepts the flow of execution of graphics driver software 430, redirects the execution to apply the mapping function, and then returns operation to graphics driver software 430. Graphics driver software 430 divides the digital image into multiple parts and sends the parts to projectors 414, 416, and 418. Projectors 414, 416, and 418 project modulated light beams 420, 422, and 424 respectively. Light beams 420, 422, and 424 from projected digital image 450 on screen 426. Sensor 412 senses the parameters of projected digital image 450 and sends the parameters to mapping software 408.

In the arrangements of FIGS. 1, 3, and 4, projectors are shown as the display devices. In alternate embodiments, projectors can be substituted with other display devices that form a displayed image other than a projected image. For example, such other display devices can comprise direct-view displays such as flat-panel liquid crystal displays or plasma display panels.

Projectors can be embedded in a variety of electronic devices such as cell phones, handheld game systems, laptop computers and/or other personal electronic devices. In an illustrative implementation personal electronic device with a single projector can employ a mapping function in accordance with the embodiments herein for such purposes as warping menus or combining images with other personal electronic devices.

Also, in the exemplary arrangements of FIGS. 1, 3, and 4, three projectors are shown, but there may one, two, three, or more projectors depending on the desired resolution, brightness, and other parameters of the projected digital image. The digital image may alternately be created by a source external to the computer and sent into the application software or directly into the compositor.

It should be apparent that one advantage of injection-based digital imaging systems such as those shown in FIGS. 3 and 4 is that they are typically free of any separate mapping hardware and software in contrast to the illustrative digital imaging system shown in FIG. 1. The injection process allows the digital imaging system to be inexpensive, simple, and compact compared to the digital imaging system without injection.

Another advantage of injection-based digital imaging systems is that they may be used with conventional off-the-shelf (COTS) projectors and COTS graphics cards. The digital imaging system shown in FIG. 1 requires specialized projectors that have the capability to accept mapping signals from the mapping software. The specialized projectors are generally used with specialized warping hardware. COTS projectors and graphics cards are inexpensive, commonly available, and more readily interchangeable between projectors and computers of different models or types. Interchangeability can enable improved optimization of the projectors and graphics cards for the projection environment and easy replacement in case of malfunction.

Yet another advantage of injection-based digital imaging systems is that they can make use of the inherent hardware acceleration in various commercially available computer graphics hardware. A system with separate hardware and software for mapping would generally be unable to utilize this hardware acceleration.

Illustratively, the use of mapping functions can be divided into two types: (1) application-dependent and (2) application-independent. Injection enables application-independent mapping with COTS graphics cards without the need for specialized hardware.

Some further considerations with respect to the mapping functions and alternate embodiments of the system and method are now described.

In an illustrative embodiment, the calculation of the mapping function generally includes sampling pixels in the digital image, calculating a new position for each pixel, and then assembling a mapped digital image with the pixels in the new position, also called re-sampling. The mapping function can also include other transformations of the pixels such as intensity or color changes. Intensity mapping of pixels is also referred to as shading. Interpolation between pixels is desired during the re-sampling. The interpolation can be performed using closest neighbor, linear, or nonlinear calculations according to conventional algorithms thereof. It is contemplated that a spatially varying filter can be included in the mapping function in order to change white level (contrast), black level (brightness), or other image parameters dependent on the spatial position and content in the digital image. The spatially varying filter can be used to control blooming or other secondary effects introduced by the display.

A variety of mapping functions can be performed depending on the requirements of the digital imaging system. The mapping functions can include warping, blending, and color matching. Warping is used, for example, to compensate for different angles of projection from multiple projectors, or to make digital images fit onto curved screens so that minimal distortion is apparent when viewing the projected digital image. Twisting and zooming may be considered two types of warping used to align multiple parts of an image to fit together when forming one projected digital image from multiple parts. Blending makes the edges of the multiple parts fit together when forming one projected digital image from multiple parts. Color matching is used to make multiple parts of the projected digital image match each other so that they appear to come from one projector. Color matching is particularly desirable when multiple projectors exhibit differing color output. The least expensive COTS projectors frequently benefit from color matching because loose manufacturing tolerances can result in large color differences between projectors of the same model. The mapping functions allow multiple projectors to be placed in position with only approximate alignment. The mapping function is then calculated to stitch together the parts of the image in order to form one digital projected image out of the multiple parts projected by each projector.

The mapping function can be a fixed transformation or it may be a temporally-varying transformation. In the temporally-varying case, the transformation may be calculated from sensor feedback or it may be calculated based on other external parameters. The calculation may take place in real time or in near real time.

The mapping function can be entirely determined by computer calculation (automatically), or it can be partially or completely supplied by user input (manually). By way of example, the user may wish to directly control the position of certain elements in the digital image with means to manipulate the image directly such as a computer mouse or other user input device.

Injection-based digital imaging systems can also be used to provide visual information such as messages to viewers. The visual information may consist of elements generated by the digital imaging system, such as menu information, device control information, notifications, or system status information. Visual information may further be created by other software operatively running on the computer hardware system, such as, but not limited to, presentation application, gaming applications, or various application GUI widgets. The visual information may further consist of content external to the digital imaging system that is operatively communicated to the digital imaging system through a communication or network link. By way of example, external content information can be communicated from a server housing a database of information, or a server hosting website information. The information can be in the form of video, image, or other data forms. By way of further example, the communication system employed can be, but not limited to, digital system such as, Wi-fi, Wimax, cellular system, and other various digital communication system. The communication system can further be configured to receive analog signal from cable operator, from analog antennae, etc. Video content can further be streamed using conventional mechanisms apparent to those skilled in the art. The information contained in the message may be inserted by the application software or at any other point in the software chain prior to and including the point of injection. The visual information may allow the user to control parameters of the projected digital image or the equipment used for projection. These parameters may include the color of the white point or other image characteristics. A graphical user interface associated with, for example the above-described computer and operating system can be utilized for toggling the injection on and off.

The injection can be toggled on or off automatically under software control. For example, if an application circumvents the compositor, the injection may be turned off to prevent unwanted changes to the image. Alternately, the injection can add a portion of computer code to an application rather than the compositor.

In an embodiment, the portion of computer code injected into the compositor can be constructed and arranged to communicate with another portion of mapping software which is located outside of the computer, such as in external mapping hardware.

The operating system can also be adapted to accept the injection of the portion of computer code used for mapping. For example, the operating system may be designed to make the injection work smoothly by passing variables to the portion of computer code.

According to an embodiment, patterns can be injected into the projected digital images for test, alignment, and/or feedback purposes. Watermarking patterns with invisibly small changes or other invisible test patterns such as individual frames may be used. The sensor can be synchronized to the individual frames. A three-dimensional user interface can be injected into the projected digital image for purposes (that should be apparent to those of skill in the art) such as controlling the computer, manipulating data, interacting with the environment in the immediate proximity to the user, or interacting with an environment remotely located from the user.

Head tracking, eye tracking, or other external parameters can be used to change the injected mapping function according to the viewer's field of view or other conditions of the viewer. In the example of warping, head tracking can be used to position the projected digital image with proper warping on a dome or other immersive screen for simulation purposes. The appropriate geometric parameters to accomplish the exemplary warp are understood by those of skill in the art.

Injection-based digital imaging systems can also be used to modify the projected digital images as a function of time. For example, if the projector alignment is only acceptable for a certain period of time (because of possible physical misalignment over time, etc.), a visible warning can be injected after the time period has expired. Alternately, the mapping function can be automatically changed after a certain period of time to compensate for a predetermined pattern of alignment drift such as thermal warming effects. In another embodiment, the mapping can be changed based on the time of day to compensate for increased ambient light during day hours of operation, awhile the compensation is removed during night hours of operation. In another embodiment, the mapping can depend on external factors such room temperature or humidity. The mapping can be predetermined in a look-up table, or can be calculated in real time or near-real time.

Sensors used for feedback in various implementations of the system can include still cameras, video cameras illustratively operating at 30 frames per second or another frame rate, ambient light sensors, or any other device that senses a characteristic of the projected digital image or the surrounding environment. In the example of still cameras, the computer may be used to trigger the camera to take pictures as required. Sensors may also be used to determine operational characteristics of the projectors such as their temperature or operation mode.

U.S. published patent application No. 20080/246781 A1, entitled SYSTEM AND METHOD FOR PROVIDING IMPROVED DISPLAY QUALITY BY DISPLAY ADJUSTMENT AND IMAGE PROCESSING USING OPTICAL FEEDBACK, by Rajeev J. Surati, et al., the teachings of which are expressly incorporated herein by reference as useful background information, describes the optical mechanical thermal and electronic (OMTE) parameters of a display. The OMTE parameters may be modified under computer or manual control and then the mapping function may make transformations to the image that work together with the OMTE changes.

A specific example of mapping function injection for a digital imaging system is based on the following three conditions: (1) There is a mapping function generated that will be injected into the digital imaging system; (2) the operating system has compositing software such as that instantiated in Microsoft Windows Vista®, wherein this compositing software can include or comprise the Desktop Window Manager (dwm.exe) in Microsoft Windows®, the equivalent windows manager in the Apple Leopard® operating system, or Compiz™ in the Linux operating system; and (3) the compositing software is enacted by a common library such as DirectX®, OpenGL™, or DDraw™. Also, in order to enable the mapping function injection, the functions that are called that display to the screen such as Present in DirectX or GLSwap in OpenGL (or a lower level functionality in an underlying library) should be known by the process. In an embodiment, the portion of computer code that performs the injection overwrites the functions used by the compositing software that are relevant for initializing. The portion of computer code further detects certain relevant states with functions that call from the original function. Prior to those calls, the portion of computer code initializes, inspects or sets states, or enacts the mapping as appropriate. In the example of Direct3D, this can occur during the operation of CreateDevice for initialization or during the operation of Present. The enactment usually initializes and utilizes a set of shaders upon a mesh, or shaders on vertices of the image. In OpenGL that would include the operation of GLSwap. In an embodiment, the portion of computer code can be injected whenever the compositing software or application software is started or restarted.

Note also that specific hardware used for implementing injection into a digital imaging system can desirably make use of commercially available computer graphics boards such as the Quadro™ series of graphics cards made by NVIDIA (Santa Clara, Calif.) in various embodiments.

In various embodiments, other implementations of injection of a mapping function include corrections for dithering, corrections for dithering before a warping correction, correction of mura defects, shading correction for transmissive LCD projectors, mapping for cell phones with embedded projectors and cameras, warping of multiplayer simulations such as Microsoft Flight Simulator X (Microsoft Corporation, Redmond, Wash.), warping the menus of the Microsoft Windows CE operating system running on projector, radial distortion correction of a single display, adjusting for display motion of a single display, showing only a portion of a larger display such as showing a circular portion of a rectangular display, and projecting on a corner of a room and correcting for the condition where one wall or the ceiling has a different color or other surface property. The specific parameters to be injected are computed in a conventional manner that should be apparent to those of skill in the art.

In various embodiments, a multiple computer platform is employed. By way of example, a first and a second computer system is configured with a first and a second compositor, respectively. The first and second computers are configured to communicate between each other over a conventional communication link in a manner that should be apparent to those skilled in the art. Computer codes are injected into the first and second computer, respectively. During operation, the first computer applies a first mapping function to output display signals to a first display which forms a displayed digital image. The display signals are based partially on the information communicated with the second computer. Similarly, the second computer applies a second mapping function to output display signals to a second display which forms a displayed digital image. The display signals are based partially on the information communicated with the first computer.

In various alternate embodiments, the mapping function is stored on a computer-readable medium. The computer code is operatively configured to control the computer hardware upon reading of the computer-readable medium by the computer, as apparent to those of ordinary skill in the art. Upon initialization by the computer system, the computer code would function as operatively described in the specification herein.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. For example, there may be provided one computer in the image display system as shown in FIGS. 1, 3, and 4, or there may be provided more than one computer in the image display system. The compositor can be distributed across multiple computers or multiple central processing units (CPUs). The multiple computers or CPUs can reside on an extended local bus, or can be connected by a network arrangement such as Ethernet. Also, there can be provided one sensor in the image display system as shown in FIGS. 1, 3, and 4, or there can be provided a plurality of sensors in the image display system. In the example of a predetermined mapping function made without sensed parameters from the projected digital image, the digital imaging system can be free of any sensors. Also, in the case of a system adapted to allow manual adjustment of parameters, geometry, etc, the system can be free of any sensors. Furthermore, it is expressly contemplated that the teachings herein can be accomplished using electronic hardware, software, consisting of computer-readable program instructions, or a combination of hardware and software. Accordingly, this description is meant to be taken only by way of example, and not to otherwise limit the scope of this invention.

What is claimed is:

1. A method of improving display quality comprising:
    providing a digital image to a graphics hardware having graphics driver software, the graphics hardware and graphics driver software being free of separate mapping hardware and mapping software;
    modifying an API interface associated with the graphics driver software by copying the existing API pointers to the graphics driver software;
    replacing at least one of the existing API pointers in the graphics driver software with a replacement set of API pointers, the replacement set of API pointers interrupting and redirecting execution of the graphics driver software to an application-independent mapping function that is distinct from the graphics driver software;
    returning to execution of the graphics driver software with the existing API pointers;
    dividing the digital image into a plurality of parts; and
    transmitting the plurality of image parts to one or more display devices for displaying a displayed image.

2. The method of claim 1, wherein the one or more display devices comprises a plurality of display devices and each display device displays a part of the displayed image.

3. The method of claim 2, wherein the display devices comprise projectors.

4. The method of claim 2, wherein the display devices are arranged so that parts of the displayed image have a partial overlap.

5. The method of claim 1, wherein the mapping function comprises at least one of: a warping function, a color mapping function, a spatially varying filter, a temporally varying filter, and an intensity mapping function.

6. The method of claim 1, wherein the digital image is formatted for display on a first type of display device and the mapping function modifies the digital image for display on a second type of display device having a different geometry from the first display device.

7. The method of claim 1, wherein the display devices are only approximately aligned and the mapping function accounts for said approximate alignment by stitching together the plurality of parts to form a single displayed image.

8. A system for improving display quality comprising:
    graphics hardware having graphics driver software that receives a digital image, the graphics hardware and graphics driver software being free of separate mapping hardware and mapping software;
    a mapping process that modifies an API interface associated with the graphics driver software by copying existing API pointers to the graphics driver software, replaces at least one of the existing API pointers in the graphics driver software with a replacement set of API pointers, the replacement set of API pointers interrupting and redirecting execution of the graphics driver software to an application-independent mapping function that is distinct from the graphics driver software, and returns to execution of the graphics driver software with the existing API pointers;
    the graphics driver further dividing the digital image into a plurality of parts and transmitting the plurality of image parts to one or more display devices for displaying a displayed image.

9. The system of claim 8, wherein the one or more display devices comprises a plurality of display devices and each display device displays a part of the displayed image.

10. The system of claim 9, wherein the display devices comprise projectors.

11. The system of claim 9, wherein the display devices are arranged so that parts of the displayed image have a partial overlap.

12. The system of claim 8, wherein the mapping function comprises at least one of: a warping function, a color mapping function, a spatially varying filter, a temporally varying filter, and an intensity mapping function.

13. The system of claim 8, wherein the digital image is formatted for display on a first type of display device and the mapping function modifies the digital image for display on a second type of display device having a different geometry from the first display device.

14. The system of claim 8, wherein the display devices are only approximately aligned and the mapping function accounts for said approximate alignment by stitching together the plurality of parts to form a single displayed image.

15. A method of improving display quality comprising:
    executing graphics driver software at a graphics hardware, the graphics driver software having existing API pointers, the graphics hardware and graphics driver software being free of separate mapping hardware and mapping software;
    providing a digital image to the graphics driver software;
    modifying an API interface associated with the graphics driver software by copying the existing API pointers to the graphics driver software;
    replacing at least one of the existing API pointers in the graphics driver software with a replacement set of API pointers, the replacement set of API pointers interrupting and redirecting execution of the graphics driver software to an application-independent mapping function that is distinct from the graphics driver software, the application-independent mapping function comprising a warping function;
    modifying the digital image using the application-independent mapping function;
    returning to execution of the graphics driver software with the existing API pointers;
    dividing the modified digital image into a plurality of parts; and
    transmitting the plurality of image parts to one or more display devices for displaying a displayed image.

* * * * *